(12) United States Patent
Strauessnigg

(10) Patent No.: US 7,136,411 B2
(45) Date of Patent: Nov. 14, 2006

(54) METHOD FOR TRANSMITTING AN ANALOG DATA STREAM WITH PREVENTION OF SECONDARY MINIMA, AND CIRCUIT ARRANGEMENT

(75) Inventor: Dietmar Strauessnigg, Villach (AT)

(73) Assignee: Infineon Technologies AG, Munich (DE)

( * ) Notice: Subject to any disclaimer, the term of this patent is extended or adjusted under 35 U.S.C. 154(b) by 760 days.

(21) Appl. No.: 10/174,848

(22) Filed: Jun. 19, 2002

(65) Prior Publication Data

US 2003/0007551 A1    Jan. 9, 2003

(30) Foreign Application Priority Data

Jun. 19, 2001 (DE) ................. 101 29 327

(51) Int. Cl.
*H04B 1/38* (2006.01)
(52) U.S. Cl. .................. 375/219; 375/346
(58) Field of Classification Search ........... 375/222, 375/227, 229–232, 285, 346, 348, 350, 219; 370/525–526, 503
See application file for complete search history.

(56) References Cited

U.S. PATENT DOCUMENTS

| 5,317,596 | A | 5/1994 | Ho et al. | |
|---|---|---|---|---|
| 6,754,261 | B1 * | 6/2004 | Liu et al. | 375/232 |
| 6,847,679 | B1 * | 1/2005 | Kim | 375/222 |
| 2001/0024454 | A1 * | 9/2001 | Hasegawa et al. | 370/503 |
| 2001/0036225 | A1 * | 11/2001 | Murata | 375/222 |

FOREIGN PATENT DOCUMENTS

EP    0 820 168 A2    1/1998

OTHER PUBLICATIONS

Kammeyer, "Nachrichtenubertragung," B.G. Teubner Stuttgart, p. 181-205, (1992).

* cited by examiner

*Primary Examiner*—Khanh Tran
(74) *Attorney, Agent, or Firm*—Jenkins, Wilson, Taylor & Hunt, P.A.

(57) ABSTRACT

The invention creates a method for transmitting an analog data stream in which secondary minima are prevented during an equalization of the analog data stream at the receiving end when approximating the channel transfer function of a transmission channel, wherein the analog data stream is received via the transmission channel, the received analog data stream is converted into a digital data stream in an analog/digital converter, the digital data stream is decimated in a decimation device in order to obtain a decimated digital data stream, a control signal is derived from either the digital data stream or the decimated digital data stream in accordance with a predeterminable adjustment of a switching device, the derived control signal is supplied to a coefficient determining device and wherein equalization coefficients are provided, together with an information item provided by the reference signal, for the equalizer for equalization of the decimated digital data stream in the time domain in the coefficient determining device via the channel transfer function of the transmission channel.

11 Claims, 5 Drawing Sheets

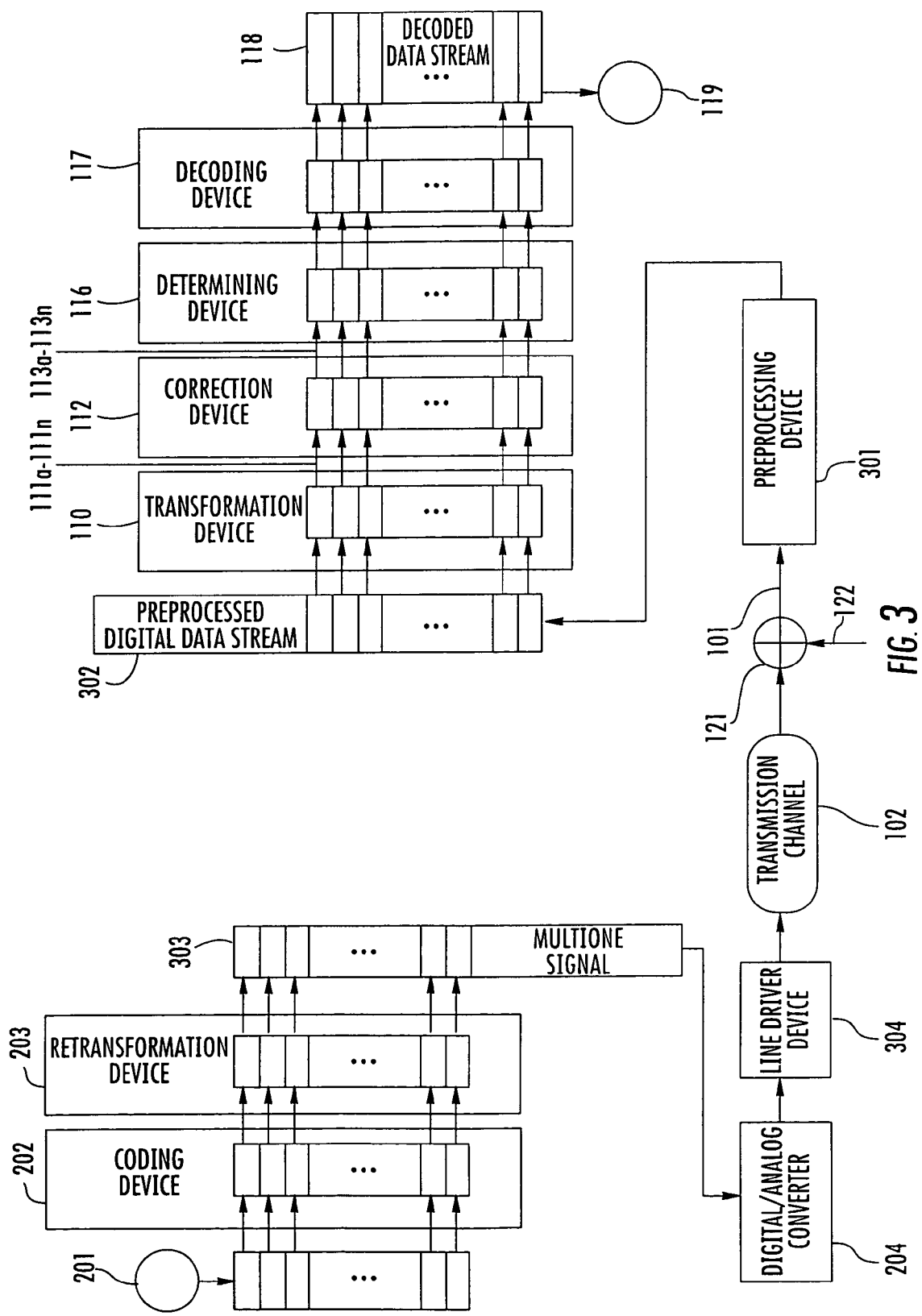

METHOD FOR TRANSMITTING AN ANALOG DATA STREAM WITH PREVENTION OF SECONDARY MINIMA, AND CIRCUIT ARRANGEMENT

TECHNICAL FIELD

The present invention relates to a method for transmitting an analog data stream and, in particular, relates to a method for transmitting an analog data stream and a circuit arrangement in which secondary minima are prevented during an equalization of the analog data stream at the receiving end.

BACKGROUND ART

Usually, a multitone method (DMT—discrete multitone) is used for asymmetric data stream transmission via normal telephone lines, normal telephone lines usually being constructed as asymmetric digital subscriber lines (ADSL).

An essential advantage of ADSL transmission techniques consists in being able to use conventional cable networks for a transmission, twisted copper conductors normally being used.

High-speed digital subscriber lines of the prior art are described, for example, in the publication "High-speed digital subscriber lines, IEEE Journal Sel. Ar. In Comm., Vol. 9, No. 6, August 1991".

Among the transmission methods with a high data rate, which are based on digital subscriber lines (DSL), a number of VDSL (Very High Data Rate DSL) arrangements are known and, for example, methods such as carrierless amplitude/phase (CAP), discrete wavelet multitone (DWMT), single line code (SLC) and discrete multitone (DMT) can be used for these. In the DMT method, the transmit signal is provided from multiple sinusoidal or cosinusoidal signals, where both the amplitude and the phase can be modulated of each individual sinusoidal or cosinusoidal signal. The multiple modulated signals thus obtained are provided as quadrature-amplitude modulated (QAM) signals.

FIG. 4 shows a conventional data stream receiver for receiving an analog data stream 101 which contains multitone signals. The multitone signals are provided by a data stream transmitter and transmitted via a transmission channel as will be described in greater detail below. After the analog data stream 101 has been received in a preprocessing device 301, a preprocessed digital data stream 302 is provided for further processing.

The preprocessing device 301 contains in conventional manner an analog/digital converter 104 by means of which the analog data stream 101 is converted into a digital data stream 103. The digital data stream 103 is then converted in conventional manner into a filtered data stream by means of a first filtering device 401, the first filtering device 401 providing a decimation of the incoming digital data stream 103.

The data thus decimated and filtered by the first filtering device 401 are provided to a second filtering device 402 in which a time domain equalization is carried out. The second filtering device 402 is constructed as an adaptive transversal filter which operates at a symbol sampling rate Fs which is, for example, 276 kHz with ADSL at a switching center. The signal equalized by the second filtering device 402 is supplied as a preprocessed digital data stream 302 to a transformation device 110 in which, for example, a fast Fourier transformation (FFT) is carried out.

The transformation signals $111a$–$111n$ formed as a complex number which is defined, for example, in accordance with amount and phase, are then supplied to a correction device 112 in which a correction of a transfer characteristic of the transmission channel is provided. The corrected transformation signals $113a$–$113n$ are also supplied to a determining device 116 in which pairs of amount signals 114 and phase signals 115 are determined in accordance with the multitone signals in the analog data stream 101. The pairs of amount signals 114 and phase signals 115 are supplied to a decoding device 117 in which the pairs of amount signals and phase signals are decoded in a decoder data stream 118. The decoded data stream 118 is then output via a data output device 119.

The frequencies of the multitone signal contained in the analog data stream 101 to be transmitted are usually equidistantly distributed and become calculable in accordance with the following formula:

$$f_i = i \cdot \frac{1}{T} \quad i = 1, 2, \ldots N/2$$

where T is a period and N is a number of samples of a DMT symbol.

For example, conventional DMT methods use 256 tones which can be modulated in amount and phase in each case as sinusoidal tones. The fundamental frequency is 4.3 kHz and the frequency spacing between successive tones is also 4.3 kHz. Thus, a frequency spectrum from 4.3 kHz (fundamental frequency) to (4.3 kHz+256×4.3 kHz)=1.1 MHz is transmitted. Each DMT symbol is thus represented by a sinusoidal tone which can be modulated in amount and phase, a maximum of 15 bits per symbol usually being represented as complex number. During the transmission of a multitone signal of this type, the problem occurs, however, that transient effects are produced by the transmission channel which, for example, can be constructed as a twisted copper dual wire, which effects have decayed after, for example, M samples.

In the transmitter device, the last M samples of a DMT symbol are appended to a block start after an inverse fast Fourier transformation (IFFT), where the following relation applies: M<N. Due to this cyclic extension (cyclic prefix), a periodic signal can be simulated for the data stream receiver when the transient effect caused by the transmission channel has decayed after M samples and mutual interference between different DMT symbols, i.e. inter-symbol interference (ISI), can be avoided.

As a result, an equalization effort in an equalizer arranged in the data stream receiver can be considerably reduced in conventional methods since after demodulation of the received analog data stream 101 in the data stream receiver, only a simple correction with the inverse frequency response of the transmission channel must be performed in the correction device 112.

In methods according to the prior art, identification of a transmission channel is provided by a transfer function which is given by the following equation:

$$H(z)=B(z)/A(z).$$

An equalizer is conventionally adjusted in such a manner that a cascading of the channel transfer function of the transmission channel and of the transfer function of the equalizer provides a resultant transfer function Hr as follows:

$$Hr=B(z).$$

It can be clearly seen that a length of a remaining impulse response is thus determined by the order of the numerator polynomial B(z).

In the known methods described above, the equalizer operates at a sampling rate Fs which is, for example, Fs=276 kHz. The order of the numerator polynomial B(z) is thus defined by the length of the cyclic prefix predetermined by the respective transmission standard, for example M=4.

An approximation of the channel transfer function, for example by means of a rational transfer function H(z) by using mathematical optimization methods, for example the method of least error squares, disadvantageously achieves a global optimum only if the order of the numerator polynomial B(z) and the order of the denominator polynomial A(z) can be selected to be sufficiently large.

In the method according to the prior art it is also disadvantageous that the order of the polynomials is restricted by the length of the cyclic prefix so that secondary minima occur when the channel transfer function of the transmission channel is approximated.

SUMMARY OF THE INVENTION

It is thus an object of the present invention to provide a method for transmitting an analog data stream in which secondary minima are prevented during an equalization of the analog data stream at the receiving end when a channel transfer function of the transmission channel is approximated.

According to the invention, this object is achieved by the method specified in claim 1 and by a circuit arrangement for transmitting an analog data stream having the features of claim 9.

Further embodiments of the invention are obtained from the subclaims.

An essential concept of the invention consists in deriving [lacuna] by deriving a control signal which is provided either from a digitized analog data stream or a decimated digital data stream via a switching device, and supplying this control signal to a coefficient determining device which, together with a reference signal 124 supplied via a reference signal input device 123, determines coefficients for the equalizer 105 in such a manner that secondary minima are prevented when the channel transfer function of the transmission channel is approximated.

It is thus an advantage of the present invention that the length in time of a cyclic prefix does not change and, in particular, the condition M<<N can be met. It is also advantageous that a variable adjustment of coefficients is provided for the equalizer by oversampling the analog data stream.

The method according to the invention for transmitting an analog data stream in which secondary minima are prevented during an equalization of the analog data stream at the receiving end, essentially exhibits the following steps:

a) receiving the analog data stream via a transmission channel in a data stream receiver;
b) converting the received analog data stream into a digital data stream by sampling the analog data stream with a sampling rate in an analog/digital converter;
c) decimating the digital data stream in a decimation device in order to provide a decimated digital data stream;
d) deriving a control signal 128 from either the digital data stream 103 or the decimated digital data stream 106 according to a predeterminable adjustment of a switching device;
e) supplying the derived control signal to a coefficient determining device;
f) supplying a reference signal, input via a reference signal input device, to the coefficient determining device, the reference signal representing a measure of the channel transfer function of the transmission channel;
g) determining at least one coefficient of an equalizer by means of the coefficient determining device in dependence on the reference signal supplied and in dependence on the control signal supplied, in such a manner that secondary minima are prevented when the channel transfer function of the transmission channel is approximated;
h) equalizing the decimated digital data stream in the time domain in the equalizer to which at least one determined coefficient has been applied, in order to provide an equalized decimated digital data stream;
i) transforming the decimated equalized digital data stream from the time domain into the frequency domain by means of a transformation device, in order to provide transformation signals which are defined in amount and phase;
j) correcting the transformation signals in a correction device in order to provide corrected transformation signals;
k) determining at least one amount signal and at least one phase signal from at least one corrected transformation signal in a determining device;
l) decoding the at least one amount signal determined in the determining device and the at least one phase signal in a decoding device in order to provide a decoded data stream; and
m) outputting the decoded data stream via a data output device.

The subclaims contain advantageous developments and improvements of the respective subject matter of the invention.

According to a preferred development of the present invention, a suitable control signal 128 is selected by means of the switching device 127, in which process a received signal oversampled with the sampling rate Fa can be optionally used for an identification which requires that the coefficients determined in the coefficient determining device must be transformed to a lower sampling rate.

According to a further preferred development of the present invention, the analog data stream is oversampled at a sampling rate in such a manner that an oversampled mode is provided for the coefficient determining device and the equalizer.

According to yet another preferred development of the present invention, the decimated digital data stream is sampled with a predeterminable rate in the equalizer.

According to yet another preferred development of the present invention, the reference signal is provided for determining a channel transfer function of the transmission channel.

According to yet another preferred development of the present invention, a fast Fourier transformation (FFT) is used for transforming the decimated equalized digital data stream from the time domain into the frequency domain.

According to yet another preferred development of the present invention, the transformation signals are weighted with an inverse channel transfer function of the transmission channel for correcting the transformation signals in a correction device in order to provide corrected transformation signals.

According to yet another preferred development of the present invention, a transformation signal pair formed of an amount signal and a phase signal is in each case provided during a determination of the at least one amount signal and of the at least one phase signal from at least one corrected transformation signal in the determining device.

The circuit arrangement according to the invention for transmitting an analog data stream in which secondary minima do not occur during an equalization of the analog data stream at the receiving end also exhibits the following:
a) a transmission channel for transmitting the analog data stream from a data stream transmitter to a data stream receiver;
b) an analog/digital converter, arranged in the data stream receiver, for converting the received analog data stream into a digital data stream by sampling the analog data stream at a sampling rate;
c) a decimation device for decimating the digital data stream in order to provide a decimated digital data stream;
d) a coefficient determining device for determining coefficients for the equalizer in dependence on a control signal supplied;
e) a reference signal input device for inputting a reference signal into the coefficient determining device;
f) an equalizer for equalizing the decimated digital data stream according to the coefficients adjusted by the coefficient adjusting device in order to provide an equalized decimated digital data stream;
g) a transformation device for transforming the decimated equalized digital data stream from the time domain into the frequency domain in order to provide transformation signals which are defined by amount and phase;
h) a correction device for correcting the transformation signals in order to provide corrected transformation signals;
i) a determining device for determining at least one amount signal and at least one phase signal from at least one corrected transformation signal;
j) a decoding device for decoding the at least one amount signal determined in the determining device and of the at least one phase signal in order to provide a decoded data stream; and
k) a data output device for outputting the decoded data stream.

BRIEF DESCRIPTION OF THE DRAWINGS

Exemplary embodiments of the invention are explained in greater detail in the description following and are shown in the drawings, in which:

FIG. 3 shows the transmission arrangement illustrated in FIG. 2a for transmitting an analog data stream in more detailed representation.

DETAILED DESCRIPTION OF THE INVENTION

In the figures, identical reference symbols designate identical or functionally equal components or steps.

Figure 1:
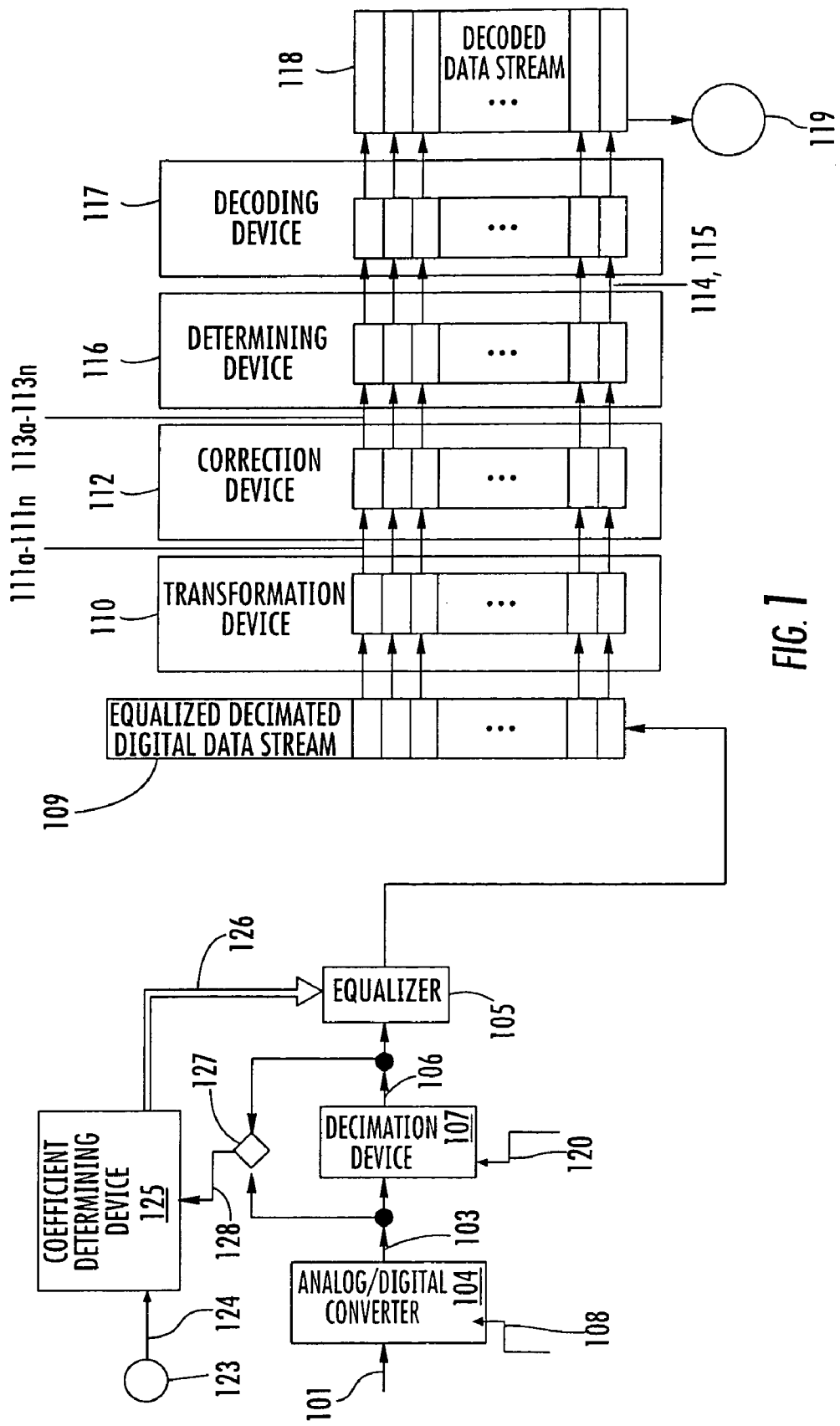
FIG. 1 shows a data stream receiver with a coefficient determining device for receiving an analog data stream according to an exemplary embodiment of the present invention.

The circuit arrangement according to an exemplary embodiment of the present invention, as shown in FIG. 1, exhibits a coefficient determining device 125 which provides equalization coefficients 126 to an equalizer 105.

In this arrangement, an analog data stream 101 is supplied to an analog/digital converter 104 which oversamples the analog data stream 101 at a sampling rate 108. The analog data stream 101 thus sampled is supplied to a decimation device 107 as a digital data stream 103. At the same time, information of the digital data stream 103 is supplied to a switching device 127.

In the decimation device 107, the digital data stream 103 is decimated so that a decimated digital data stream 106 is obtained. Information from the decimated digital data stream 106 is supplied to the switching device 127.

The decimated digital data stream 106 is supplied to the equalizer which exhibits equalization coefficients 126 determined in the coefficient determining device 125. An equalized decimated digital data stream 109 is supplied to a transformation device 110 as output signal from the equalizer 105.

The transformation device 110 provides a transformation of the decimated equalized digital data stream 109 into transformation signals 111a–111n, where n represents the maximum number, 256 in the present example, of the cosinusoidal or sinusoidal signals defined in amount and phase. It should be pointed out that the transformation device 110 performs a digital transformation of a signal which is digitally present in the time domain into a signal which is digitally present in the frequency domain.

The transformation signals 111a–111n correspond, for example, to complex numbers for each of the multitones, evaluation being provided in amount and phase or, respectively, as a real component and imaginary component. Furthermore, the complex numbers can be provided as amplitudes of cosinusoidal (real component) and sinusoidal oscillations (imaginary component) to be sent out within a block, the frequencies being provided equidistantly distributed in accordance with the equation specified above, the data to be transmitted being combined in blocks.

It should be pointed out that more or fewer than 256 different tones can be transmitted as cosinusoidal or sinusoidal signals which are defined and can be modulated in amount and phase, resulting in a correspondingly different number of transformation signals 111a–111n. The first transformation signal is here designated as 111a and the last transformation signal as 111n. The transformation device 110 preferably carries out a fast Fourier transformation (FFT) in order to provide a fast transformation from the time domain into the frequency domain.

In a correction device 112, the transformation signals 111a–111n are weighted with a known correction function which is input to the correction device 112. This correction function input into the correction device 112 is preferably but not exclusively an inverse of the channel transfer function of the transmission channel. This makes it possible to compensate for influences of the transmission channel with respect to frequency response, phase etc., so that corrected transformation signals 113a–113n are obtained at the output of the correction device 112. The corrected transformation signals 113a–113n are then supplied to a determining device 116 in which at least one amount signal 114 and at least one phase signal 115 or, respectively, a real component and an imaginary component, of a corrected transformation signal is determined.

The amount signals 114 and phase signals 115, determined in the determining device, are then decoded by supplying the amount signals 114 and the phase signals 115 to a decoding device 117.

In the decoding device 117, decoding according to a coding of the data stream performed in the data stream transmitter 210 (described below) is provided. The decoding device 117 thus outputs a decoded data stream 118 which is finally supplied to a data output device 119 and can be output from there and processed further.

The switching device 127 chooses between an information item of the digital data stream 103 and an information item of the decimated digital data stream 106 as a control signal 128 and supplies the resultant choice to the coefficient determining device 125 as the control signal 128. The coefficient determining device 125 is also supplied with a reference signal 124 input into the reference signal input device 123. This reference signal is a measure of a channel transfer function of the transmission channel so that the information is included in a determination of the equalization coefficient 126. According to the invention, the analog data stream 101 oversampled at the sampling rate 108 is processed in such a manner that the number of degrees of freedom during a determination of the equalization coefficients is increased with a predetermined length of a cyclic prefix.

The correction device 112 provided for supplying corrected transformation signals 113a–113n can be constructed as a frequency domain equalizer. The equalizer 105 also exhibits a variably adjustable filter order.

Figure 2A:
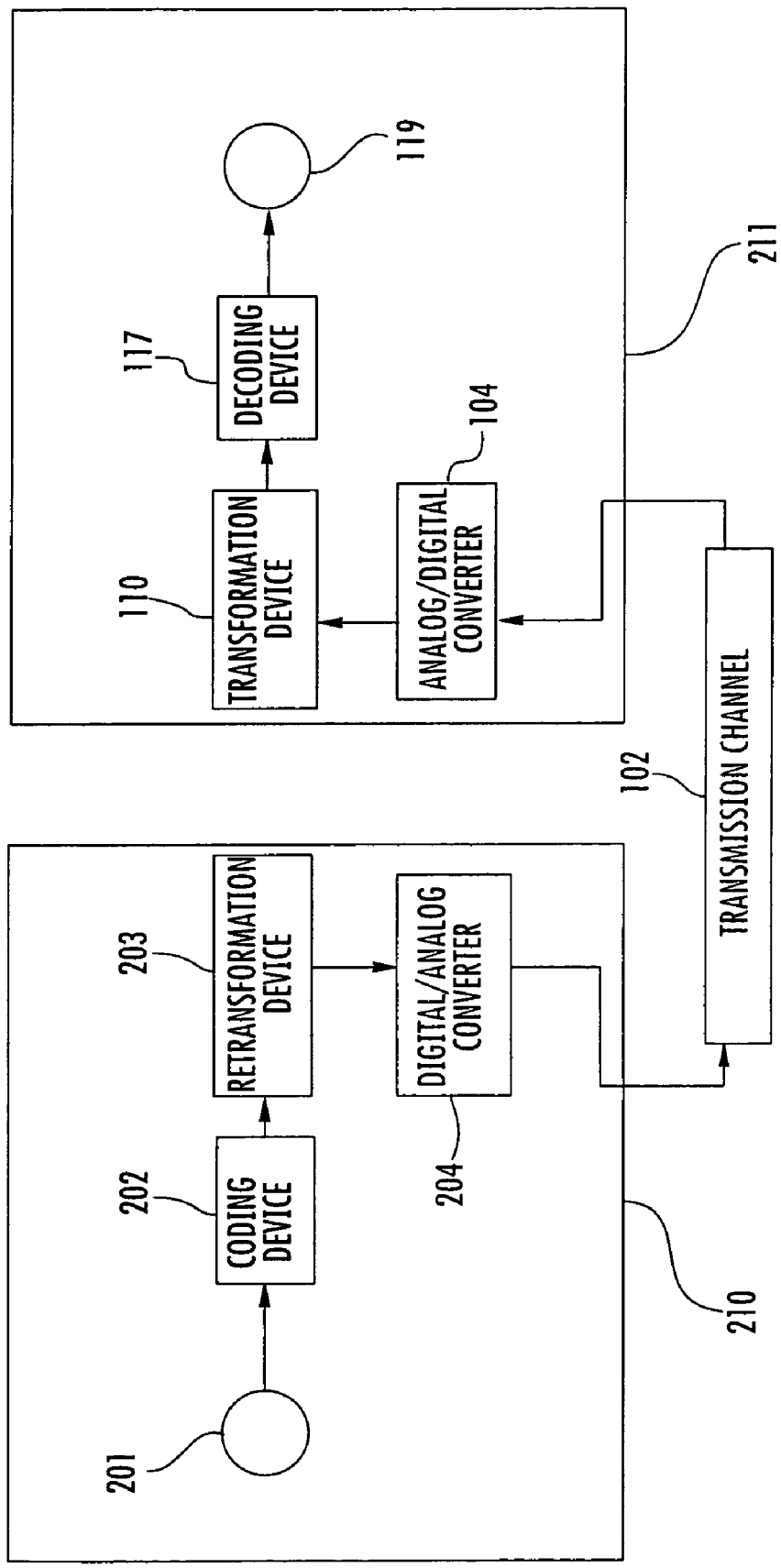
FIG. 2a shows a block diagram of a DMT transmission link with data stream transmitter, transmission channel and data stream receiver.

FIG. 2a shows a basic block diagram of an arrangement for transmitting an analog data stream according to the DMT method, the data stream transmitter 210, the transmission channel 102 and the data stream receiver 211 being illustrated.

Data stream transmitter 210 and data stream receiver 211 consist of separately identifiable blocks which will be briefly described in the text which follows. A data input device 201 is used for inputting data to be transmitted, the input data being forwarded to a coding device 202. In the coding device 202, the data stream is decoded in accordance with a conventional method and supplied to a retransformation device 203.

The retransformation device 203 provides a transformation of data present in the frequency domain into data present in the time domain. The retransformation device 203 can be provided, for example, by a device in which an inverse fast Fourier transformationation (IFFT) is performed.

It should be pointed out that the transformation from the frequency domain into the time domain performed in the retransformation device 203 represents a transformation which is inverse to the transformation performed by the transformation device 110 shown in FIG. 1.

Finally, the digital data stream output by the retransformation device 203 is converted into an analog data stream by means of a digital-analog converter 204. The analog data stream, which is now present in the time domain, is supplied to a transmission channel 102 which provides the data transmission described above, and for the transmission, there can be band-pass filtering, high-pass filtering and/or low-pass filtering and an application of noise to the analog data stream 101. The analog data stream 101 is furthermore supplied to the analog-digital converter 104 arranged in the data stream receiver 211, which converts the received analog data stream 101 into a digital data stream 103, the converted digital data stream 103 being supplied to the transformation device 110.

After a transformation, which is the inverse to that in the retransformation device 203, from the frequency domain into the time domain, the transformed data stream, after passing through a correction device (not shown) and a determining device (not shown), is decoded in the decoding device 117. The decoded data stream is finally output via the data output device 119.

Figure 2B:
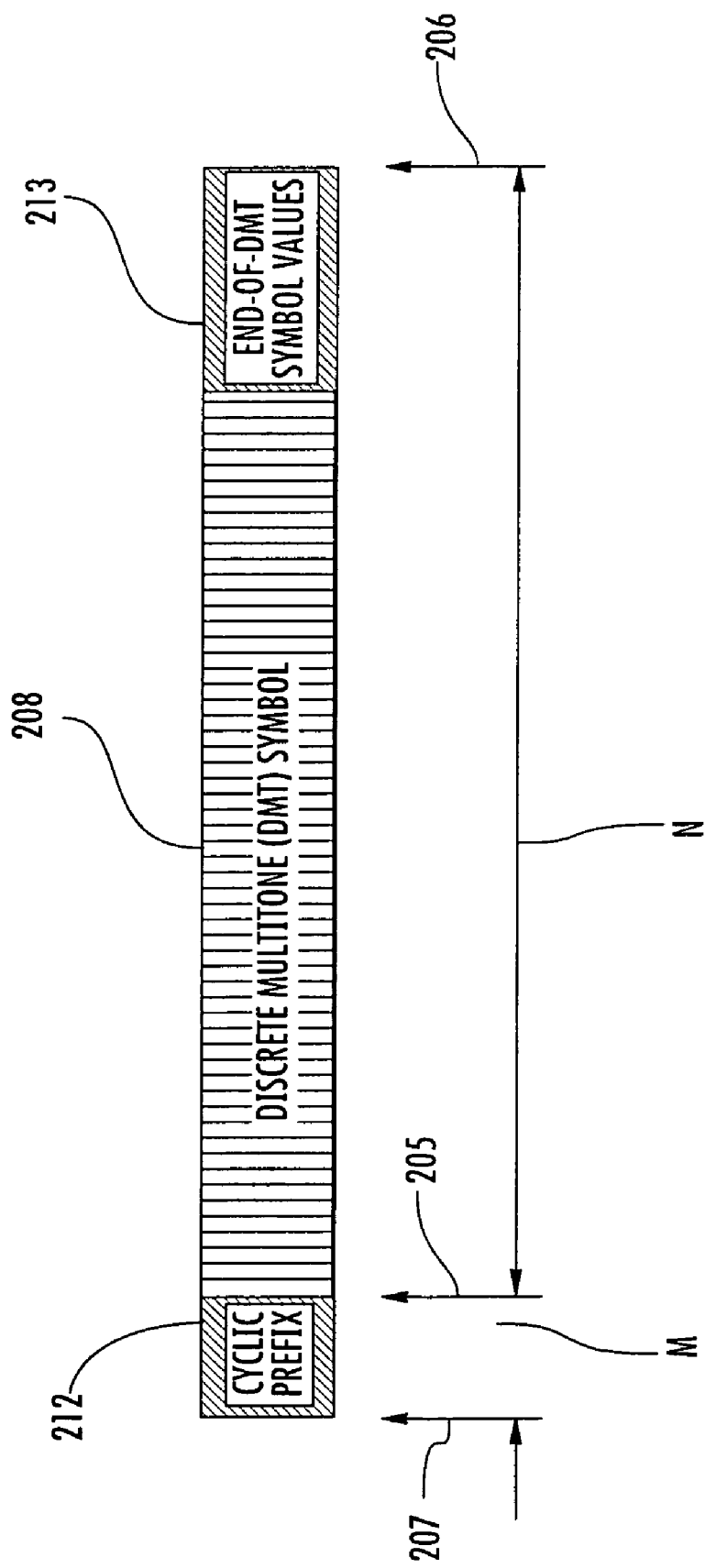
FIG. 2b shows a diagrammatic structure of a DMT symbol with cyclic prefix.

FIG. 2b shows an arrangement of a discrete multitone symbol, the analog data stream to be transmitted being provided as a sequence of multitone symbols. Before the data transformed in the transformation device 203 are forwarded to the digital-analog converter 204, the last M samples of a multitone symbol are again appended to the start of the block which defines a cyclic prefix and where the following applies:

M<N

This makes it possible to simulate a periodic signal for a data stream receiver if the transient effect caused by the transmission channel has decayed after M samples, i.e. there is no inter-symbol interference (ISI).

As shown in FIG. 2b, the original multitone symbol has a length of N samples, for example N=64 whereas, for example, the last four values are placed at the start of the symbol 205 as a cyclic prefix 212, where:

M=4.

The total length of a multitone symbol 208, together with the end of DMT symbol values 213 appended to the start of the symbol 205, is then M+N from the start of prefix 207 to the end of DMT symbol 206.

It should be pointed out that the number of end of DMT symbol values 213 cyclically appended to the start of symbol 205 must be kept as small as possible, i.e. M<<N in order to obtain the least possible reduction in transmission capacity and quality.

In another example, a multitone symbol 208 consists of 256 complex numbers which means that 512 time samples (real and imaginary component) must be transmitted as a periodic signal. In this example, if a total of 32 end of DMT symbol values 213 are copied to the start of the symbol as cyclic prefix 212, a total length of the time sample to be transmitted is calculated to be 544; which results in a sampling period $T_A$ of $544 \times 10^{-6}/2.208$ s or 0.25 ms, at a maximum tone frequency of a DMT signal of 2.208 MHz, the symbol transmission frequency being calculated from $f_{DMT}=1/T_A \approx 4$ kHz.

FIG. 3 shows a method for transmitting an analog data stream and a circuit arrangement in a more detailed representation.

The data stream supplied to the data input device 201 is combined into blocks and a certain number of bits to be transmitted is allocated to a complex number depending on scaling. In the coding device 202, finally, coding takes place in accordance with the selected scaling, the coded data stream finally being supplied to the retransformation device 203.

A multitone signal 303 provided by the retransformation device 203 finally forms a digital transmitter data stream which has been transformed from the frequency domain into the time domain. The multitone signal 303 formed as a digital data stream is finally converted into an analog data stream in the digital-analog converter 204 and supplied to a line driver device 304.

The line driver device 304 amplifies or drives, respectively, the analog data stream 101 to be transmitted into a transmission channel 102, the channel transfer function of which is known in principle or can be measured. In the transmission channel, noise is also superimposed on the analog data stream which is shown by a superposition device 121 in FIG. 3. The superposition device 121 is supplied with the analog data stream transmitted from the transmission channel and with a noise signal 122 so that, finally, an analog data stream 101 is obtained on which noise is superimposed.

The analog data stream 101 is supplied to a preprocessing device 301. A preprocessed digital data stream 302 output by the preprocessing device 301 is finally supplied to the circuit unit of the data stream receiver which have already been described with reference to FIG. 1. The description of the components of the data stream receiver 211, shown in FIG. 3, are thus left out here in order to prevent an overlapping description.

However, it should be pointed out that a decimation of the equalized digital data stream 106 can be suppressed and it must then be possible to apply a correspondingly higher rate to the transformation device 110 which results in the advantage that a further improvement in the quality of transmission is thus provided.

Figure 4:
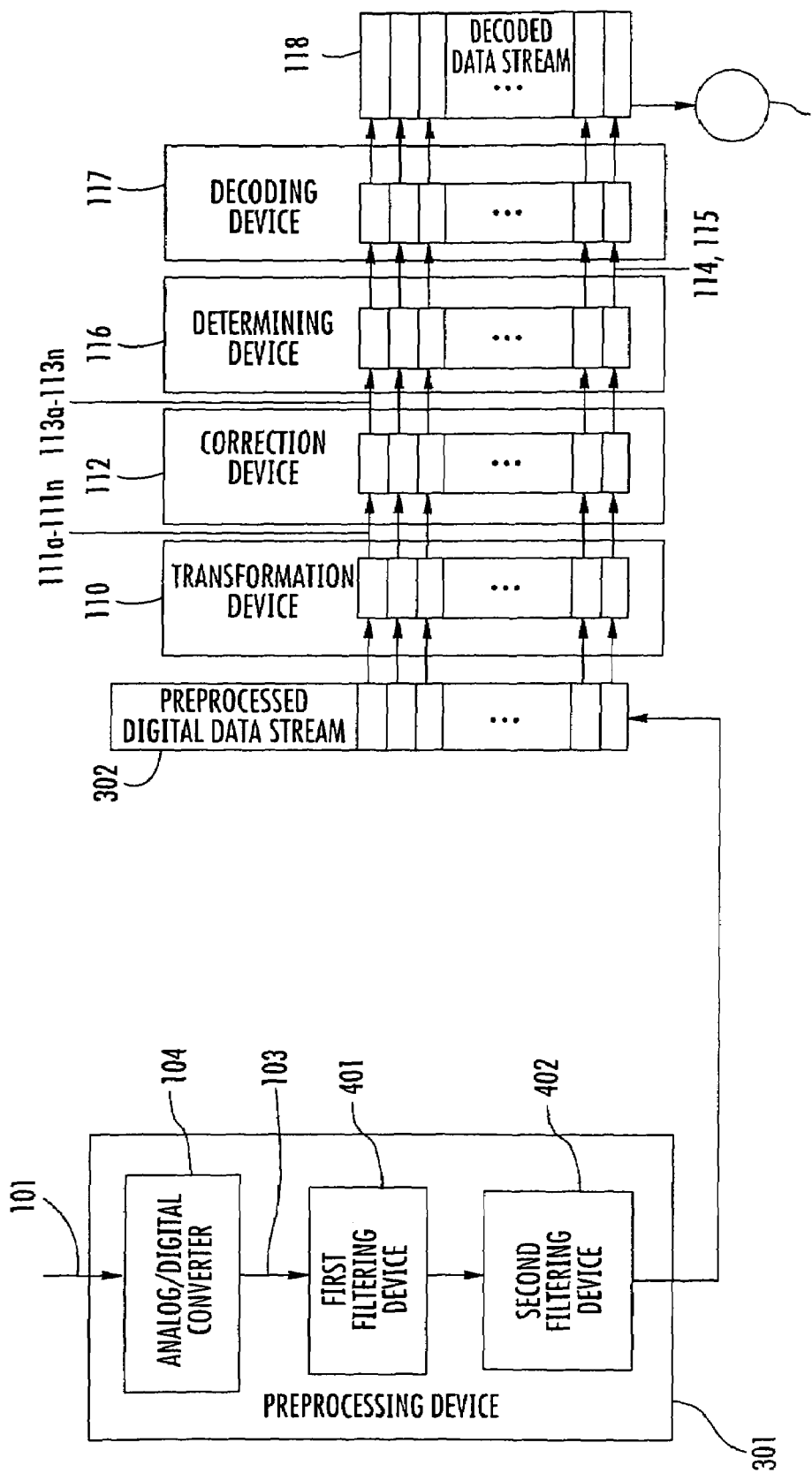
FIG. 4 shows a conventional data stream receiver.

With respect to the conventional data stream receiver shown in FIG. 4, reference is made to the introduction to the description.

Although the present invention has been described above by means of preferred exemplary embodiments, it is not restricted to these but can be modified in any variety of ways.

LIST OF REFERENCE DESIGNATIONS

In the figures, identical reference symbols designate identical or functionally equal components or steps.

| | |
|---|---|
| 101 | Analog data stream |
| 102 | Transmission channel |
| 103 | Digital data stream |
| 104 | Analog/digital converter |
| 105 | Equalizer |
| 106 | Decimated digital data stream |
| 107 | Decimation device |
| 108 | Sampling rate |
| 109 | Equalized decimated digital data stream |
| 110 | Transformation device |
| 111a–111n | Transformation signals |
| 112 | Correction device |
| 113a–113n | Corrected transformation signals |
| 114 | Amount signal |
| 115 | Phase signal |
| 116 | Determining device |
| 117 | Decoding device |
| 118 | Decoded data stream |
| 119 | Data output device |
| 120 | Symbol rate |
| 121 | Superposition device |
| 122 | Noise signal |
| 123 | Reference signal input device |
| 124 | Reference signal |
| 125 | Coefficient determining device |
| 126 | Equalization coefficients |
| 127 | Switching device |
| 128 | Control signal |
| 201 | Data input device |
| 202 | Coding device |
| 203 | Retransformation device |
| 204 | Digital/analog converter |
| 205 | Start of DMT symbol |
| 206 | End of DMT symbol |
| 207 | Start of prefix |
| 208 | Discrete multitone (DMT) symbol |
| 210 | Data stream transmitter |
| 211 | Data stream receiver |
| 212 | Cyclic prefix |
| 213 | End-of-DMT symbol values |
| 301 | Preprocessing device |
| 302 | Preprocessed digital data stream |
| 303 | Multitone signal |
| 304 | Line driver device |
| 401 | First filtering device |
| 402 | Second filtering device |

The invention claimed is:

1. A method for transmitting an analog data stream, the method having the following steps:
   a) receiving the analog data stream via a transmission channel in a data stream receiver;
   b) converting the received analog data stream into a digital data stream by sampling the analog data stream with a sampling rate in an analog/digital converter;
   c) decimating the digital data stream in a decimation device in order to provide a decimated digital data stream;
   d) deriving a control signal from either the digital data stream or the decimated digital data stream according to a predeterminable adjustment of a switching device;
   e) supplying the derived control signal to a coefficient determining device;
   f) supplying a reference signal, input via a reference signal input device, to the coefficient determining device;
   g) determining at least one coefficient of an equalizer by means of the coefficient determining device in dependence on the reference signal supplied and in dependence on the control signal supplied;
   h) equalizing the decimated digital data stream in the time domain in the equalizer to which at least one determined coefficient has been applied, in order to provide an equalized decimated digital data stream;
   i) transforming the decimated equalized digital data stream from the time domain into the frequency domain by means of a transformation device, in order to provide transformation signals which are defined in amount and phase;
   j) correcting the transformation signals in a correction device in order to provide corrected transformation signals;
   k) determining at least one amount signal and at least one phase signal from at least one corrected transformation signal in a determining device;
   l) decoding the at least one amount signal determined in the determining device and the at least one phase signal in a decoding device in order to provide a decoded data stream; and
   m) outputting the decoded data stream via a data output device.

2. The method as claimed in claim 1, wherein a suitable control signal is selected by means of the switching device.

3. The method for transmitting an analog data stream as claimed in claim 1, wherein the analog data stream is oversampled at a sampling rate.

4. The method for transmitting an analog data stream as claimed in claim 1, wherein the decimated digital data stream is sampled at a predeterminable rate in the equalizer.

5. The method for transmitting an analog data stream as claimed in claim 1, wherein the reference signal is provided for determining a channel transfer function of the transmission channel.

6. The method for transmitting an analog data stream as claimed in claim 1, wherein a fast Fourier transformation is used for transforming the decimated equalized digital data stream from the time domain into the frequency domain.

7. The method for transmitting an analog data stream as claimed in claim 1, wherein the transformation signals are weighted with an inverse channel transfer function of the transmission channel for correcting the transformation signals in a correction device in order to provide corrected transformation signals.

8. The method for transmitting an analog data stream as claimed in claim 1, wherein a transformation signal pair formed of an amount signal and a phase signal is in each case provided during a determination of the at least one amount signal and of the at least one phase signal from at least one corrected transformation signal in a determining device.

9. A circuit arrangement for transmitting an analog data stream, comprising:
   a) a transmission channel for transmitting the analog data stream from a data stream transmitter to a data stream receiver;
   b) an analog/digital converter arranged in the data stream receiver for converting the received analog data stream into a digital data stream by sampling the analog data stream at a sampling rate;
   c) a decimation device for decimating the digital data stream in order to provide a decimated digital data stream;
   d) a switching device which provides either an information item from the digital data stream or an information item from the decimated digital data stream as a control signal in dependence on an externally predeterminable switching signal;
   e) in dependence on the control signal applied, a coefficient determining device for determining equalization coefficients which is applied to an equalizer;
   f) a reference signal input device for inputting a reference signal which is provided for the coefficient determining device in order to provide the coefficient determining device with information on the channel transfer function of the transmission channel;
   g) an equalizer for equalizing the digital data stream in the time domain in order to provide an equalized digital data stream;
   h) a transformation device for transforming the decimated equalized digital data stream from the time domain into the frequency domain in order to provide transformation signals which are defined by amount and phase;
   i) a correction device for correcting the transformation signals in order to provide corrected transformation signals;
   j) a determining device for determining at least one amount signal and at least one phase signal from at least one corrected transformation signal;
   k) a decoding device for decoding the at least one amount signal and of the at least one phase signal determined in the determining device, in order to provide a decoded data stream; and
   l) a data output device for outputting the decoded data stream.

10. The circuit arrangement for transmitting an analog data stream as claimed in claim 9, wherein the equalizer exhibits a variable adjustable filter order.

11. The circuit arrangement for transmitting an analog data stream as claimed in claim 9, wherein the equalizer is constructed as a frequency domain equalizer for correcting the transformation signals in a correction device in order to provide corrected transformation signals.

* * * * *